United States Patent [19]

Geng

[11] Patent Number: 4,535,940

[45] Date of Patent: Aug. 20, 1985

[54] METHOD OF REPLASTIFYING THERMOPLASTIC STRIPS, FOILS OR WEBS

[75] Inventor: Hans Geng, Kelberg, Fed. Rep. of Germany

[73] Assignee: Plastik-Maschinenbau GmbH & Co., KG, Kelberg, Fed. Rep. of Germany

[21] Appl. No.: 517,633

[22] Filed: Jul. 27, 1983

Related U.S. Application Data

[62] Division of Ser. No. 167,016, Jul. 9, 1980, abandoned.

[30] Foreign Application Priority Data

Mar. 21, 1980 [DE] Fed. Rep. of Germany ....... 3010825

[51] Int. Cl.³ .............................................. B02C 19/22
[52] U.S. Cl. .......................................... 241/3; 241/30; 241/260.1; 425/207
[58] Field of Search .................. 241/3, 30, 260.1, 261, 241/82.6; 366/76, 88, 90; 198/657, 670; 425/207, 208

[56] References Cited

U.S. PATENT DOCUMENTS 3,327,348 6/1967 Roehlig et al. ..................... 366/76

FOREIGN PATENT DOCUMENTS 2351328 4/1975 Fed. Rep. of Germany .

Primary Examiner—Mark Rosenbaum
Assistant Examiner—Joseph M. Gorskl

[57] ABSTRACT

A method of replastifying thermoplastic foil strips comprising the steps of: rotating a worm within a cylinder baffel having a chamber, an inlet end, outlet end, and a widened area in the region of the inlet end; winding at least one continuous thermoplastic foil strip in multiple layers completely around the worm in the widened area; compressing the layers of the at least one strip on the worm; snagging the at least one strip wound on the worm on edges of at least one longitudinal groove formed on a wall of the chamber, thereby causing the at least one strip to be cut into pieces; and advancing the pieces from the chamber by rotation of the worm.

1 Claim, 5 Drawing Figures

METHOD OF REPLASTIFYING THERMOPLASTIC STRIPS, FOILS OR WEBS

This application is a division of application Ser. No. 167,016 filed July 9, 1980, now abandoned.

FIELD OF THE INVENTION

My present invention relates to a worm extruder. More particularly, my present invention relates to a method of and an extruder for replastifying rejected plastic webs, foils or strips.

BACKGROUND OF THE INVENTION

Conventional processes for processing scrap thermoplastic foils, strips or webs into reusable resin masses generally involve cutting the strips into small pieces prior to feeding to a masticating worm extruder. Most known masticators cannot take long webs without such prior cutting.

A preparation device described in German Open Application (Deutsche Offenlegungsschrift) 2,351,328 includes a worm extruder with blade-like worm threads at a receiving or feed opening, the blades interacting with corresponding formations on the extruder barrel to cut incoming foil strips into pieces. Such a device, however, must frequently employ additional cutting machines upstream of the extruder feed opening, and means are provided for stuffing the precut strips into the extruder barrel.

OBJECTS OF THE INVENTION

An object of my present invention is to provide a method of replastifying scrap thermoplastic foils, strips or webs which does not require a separate precutting thereof prior to feeding them to a worm extruder.

Another object of my present invention is to provide an improved worm extruder for carrying out the aforementioned method.

SUMMARY OF THE INVENTION

A method of replastifying thermoplastic foil strips comprises, in accordance with my invention, the steps of rotating a worm within a cylinder barrel having a chamber surrounding the worm at an inlet end and an axial outlet at an opposite end of the barrel, feeding the strips laterally into the chamber and winding them on the worm in the chamber, snagging the wound strips on edges of at least one longitudinal groove formed on a wall of the chamber, thereby causing the strips to be cut into pieces, advancing the pieces from the chamber by rotation of the worm, and masticating and plastifying the pieces along the cylinder barrel.

A worm extruder designed to implement the above method for replastifying scrap, waste or defective thermoplastic foil in preparation for recasting comprises, according to my present invention, an elongate barrel having at one end a resin egress and at an opposite end an elongate feed opening disposed parallel to a longitudinal axis of symmetry of the barrel. The barrel is provided with a chamber communicating with the feed opening for receiving plastic webs and a cylindrical bore concentric with the symmetry axis and extending from the receiving chamber to the resin egress, the bore having at least one groove extending from the chamber parallel to the symmetry axis for catching or snagging webs. A loader is connected to the feed opening for delivering plastic webs to the receiving chamber of the extruder barrel and a shaft is journaled in the bore and is provided with at least one worm thread and a shaft portion traversing the receiving chamber. A drive is connected to the shaft for rotating the same about the symmetry axis, whereby a plastic web fed to the receiving chamber is wound about the shaft portion in the chamber and is subsequently caught by the groove and ground up between the worm thread and a surface of the bore.

According to another feature of my present invention, the receiving chamber is defined in part by a cylindrical surface formed in the barrel concentrically with the axis and in part by an additional surface joined on one side to the cylindrical surface at a cuspidal line extending parallel to the axis and on an opposite side to a vertical surface forming a boundary of the feed opening. Preferably, the connection between the vertical surface and the additional chamber surface is smooth; the vertical surface forms a tangent to the chamber surface. This surface spirals outward from the cuspidal line to the vertical surface, whereby the receiving chamber is formed with an eccentric peripheral space sickle-shaped in cross section traverse to the symmetry axis. The spiral surface extends into the extruder bore toward the resin egress; the chamber surfaces are advantageously polished.

According to further features of my present invention, the cylindrical chamber surface is provided opposite the spiral surface with a plurality of longitudinal grooves parallel to the symmetry axis and angularly spaced from one another by sixty degrees, these grooves extending substantially farther into the bore than the spiral surface. The bore is provided with a plurality of catch grooves extending from the chamber parallel to the axis and angularly spaced from one another and from the longitudinal grooves of the receiving chamber. Preferably, the receiving-chamber grooves form catch grooves in the cylinder bore, there being a total of six catch grooves equispaced by sixty degrees. The bore surface is smooth or polished in an area including the catch grooves.

BRIEF DESCRIPTION OF THE DRAWING

These and other features of my present invention will now be described in detail, reference being made to the accompanying drawing in which.

SPECIFIC DESCRIPTION

Figure 2:
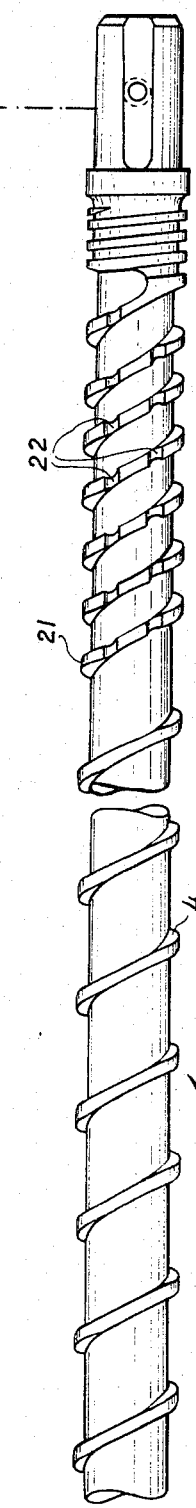
FIG. 2 is a side view of an extruder shaft journalable and rotatable in a bore of the cylinder of FIG. 1.

As shown in the drawing, an extruder for replastifying webs, foils, strips, scrap and waste of thermoplastic strips comprises a cylindrical barrel 1 (see FIGS. 3 and 4) provided with a cylindrical bore 2 concentric with an axis of symmetry 13 of the barrel and extending from a receiving chamber 7 to a resin outlet or egress 6. Chamber 7 communicates with an elongate feed opening 5 which in turn is connected to a conventional delivery channel 14 for guiding plastic strips or webs into the interior of the receiving chamber. Inside this chamber the strips are wound about a masticating shaft 3 journaled in bore 2 and provided with at least one worm thread 4. The shaft, shown separately in FIG. 2, is connected to a source 15 of rotary power.

According to my present invention, bore 2 has a smooth wall or surface 8 joining chamber 7, this wall being formed with at least one longitudinal groove 9 extending from chamber 7 parallel to axis 13. Advantageously, wall 8 is provided with six such grooves 9 angularly equispaced from one another for catching or snagging webs wound about shaft 3 and thus causing these webs to be cut into pieces by worm thread 4 and bore surface 8.

Figure 1:
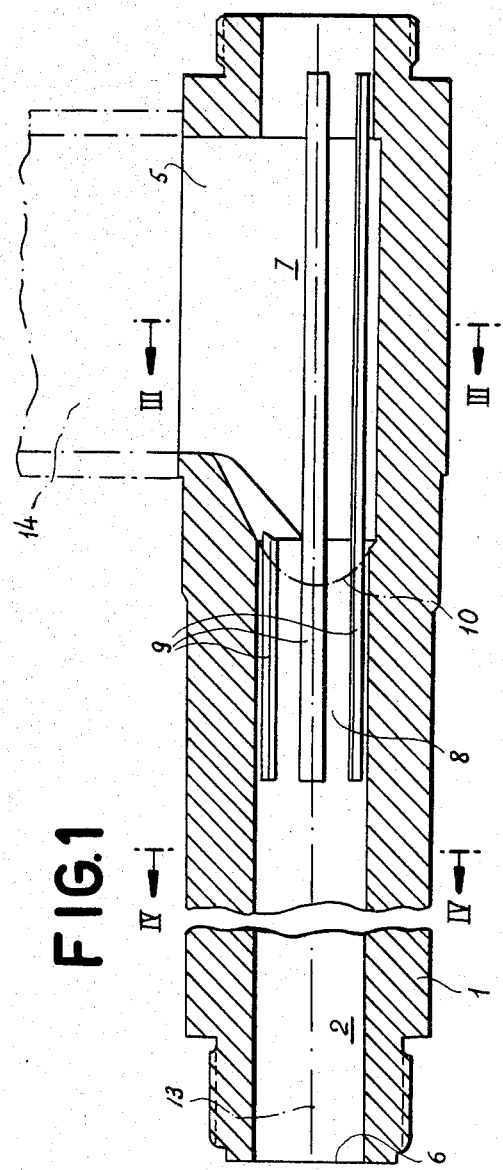
FIG. 1 is a longitudinal cross section of an extruder cylinder according to my present invention.
Figure 5:
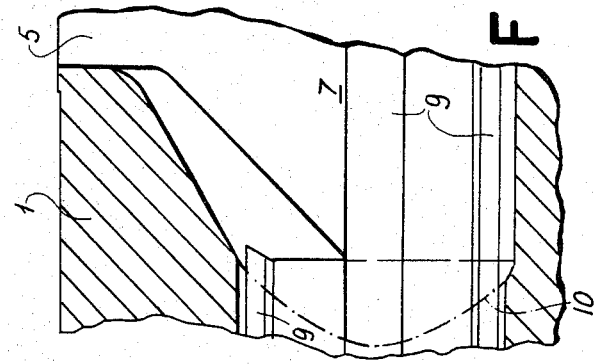
FIG. 5 is a detail view of a portion of the cylinder of FIG. 1.
Figure 3:
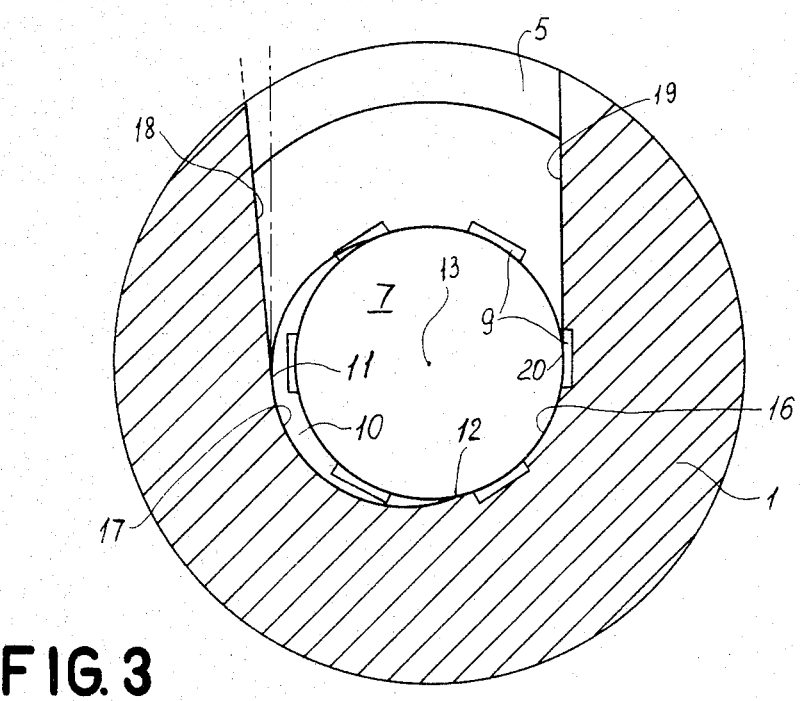
FIG. 3 is a cross-sectional view taken along line III—III in FIG. 1.
Figure 4:
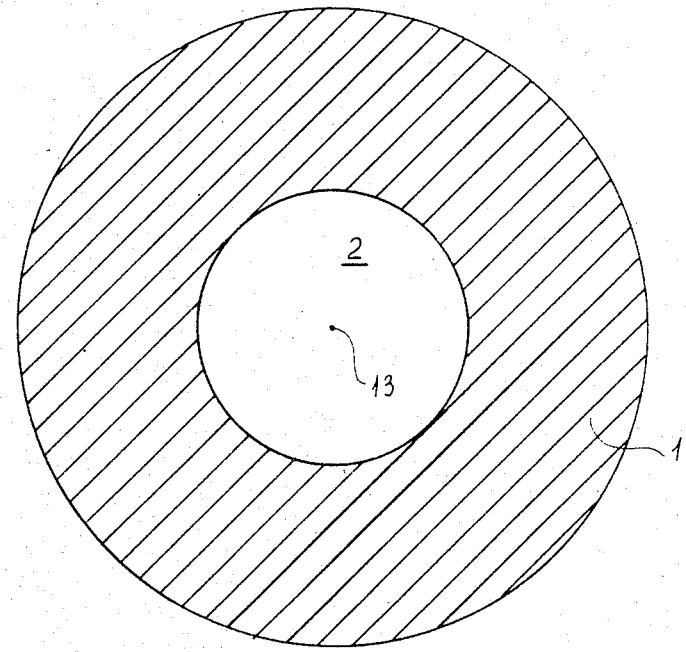
FIG. 4 is a cross-sectional view taken along line IV—IV in FIG. 1.

As illustrated in FIG. 3, chamber 7 is defined by a cylindrical surface 16 concentric with axis 13 and an additional surface 17 joined to surface 16 at a cuspidal line 12 extending parallel to axis 13. Additional surface 17 spirals outward from cuspidal line 12 and is smoothly, i.e. without discontinuities or cusps, connected to a substantially vertical surface 18 forming one of a pair 18, 19 of parallel walls or boundary surfaces of feed opening 5. Boundaries 18 and 19 form tangents to surfaces 17 and 16 at 11 and 20, respectively. As shown in FIG. 3, chamber 7 is substantially cylindrical but is provided with a peripheral sickle-shaped space 10 defined by spiral surface 17 and inner bore surface 8. As illustrated in FIGS. 1 and 5, this eccentric space or bulge of chamber 7 extends into bore 2 toward egress 6.

Chamber 7 is formed with at least a pair of longitudinal grooves parallel to axis 13, preferably extensions of catch grooves 9. Within the web-receiving chamber 7 the grooves 9 are disposed in cylindrical surface 16 opposite space 10 and are angularly spaced by sixty degrees from one another.

In an extruder according to my present invention a plurality of foil webs of varying thicknesses and of multiple layers may be fed to receiving chamber 7 simultaneously for winding about shaft 3 and for subsequent grinding by means of the coaction of grooves 9, worm thread 4 and bore surface 8. Barrel egress 6 may be connected to a worm extruder (not shown) fitted with a die for casting foil strips or with a blower for pressurizing foil tubes.

As shown in FIG. 2, shaft 3 is advantageously provided with an additional thread 21 interleaved with thread 4 in the region of chamber 7 for facilitating in part the uptake of plastic webs onto shaft 3. Threads 4 and 21 may be formed with equispaced notches 22 serving to catch or snag incoming webs at the beginning of a winding process.

I claim:

1. A method of replastifying thermoplastic foil strips, comprising the steps of:
    rotating a worm within a cylinder barrel having a chamber surrounding said worm at an inlet end, an axial outlet at an opposite end of said barrel, and a widened area in the region of said inlet end;
    winding at least one continuous thermoplastic foil strip in multiple layers completely around said worm in the widened area of said chamber wherein said strips are laterally fed into said chamber;
    compressing the layers of said at least one strip on said worm;
    snagging said at least one strip wound on said worm in said chamber on edges of at least one longitudinal groove formed on a wall of said chamber, thereby causing said at least one strip to be cut into pieces;
    advancing said pieces from said chamber by rotation of said worm; and
    masticating and plastifying said pieces along said barrel, said chamber having a lateral feed opening bounded in part by a vertical surface extending parallel to an axis of said worm and said chamber and wherein said chamber is defined in part by a cylindrical surface formed in said barrel concentrically with said axis and in part by an additional surface joined on one side to said cylindrical surface at a cuspidal line extending parallel to said axis and on an opposite side to said vertical surface in a smooth connection, said additional surface spiraling outward from said cuspidal line to said vertical surface, so that said chamber is formed with an eccentric peripheral space sickle-shaped in cross section traverse to said axis whereby the foil strips are wrapped around said worm until they are compressed in said space in the sickle-shape cross section of said space.

* * * * *